United States Patent
Schmidt et al.

(10) Patent No.: US 10,317,558 B2
(45) Date of Patent: Jun. 11, 2019

(54) EMU IMPULSE ANTENNA

(71) Applicant: Saudi Arabian Oil Company, Dhahran (SA)

(72) Inventors: Howard K. Schmidt, Dhahran (SA); Jesus Manuel Felix Servin, Dhahran (SA); Erika Ellis, Dhahran (SA); Mazen Y. Kanj, Dhahran (SA); Abdullah Awadh Al-Shehri, Atlanta, GA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/458,772

(22) Filed: Mar. 14, 2017

(65) Prior Publication Data
US 2018/0267191 A1    Sep. 20, 2018

(51) Int. Cl.
*G01V 5/04*    (2006.01)
*G01V 3/02*    (2006.01)
(Continued)

(52) U.S. Cl.
CPC .................. *G01V 3/02* (2013.01); *G01V 3/20* (2013.01); *G01V 3/30* (2013.01); *G01V 2003/084* (2013.01)

(58) Field of Classification Search
CPC . G01V 5/04; G01V 5/101; G01V 5/12; G01V 5/06; G01V 5/08; G01V 5/045;
(Continued)

(56) References Cited

U.S. PATENT DOCUMENTS

| 3,146,351 A | 8/1964 | Hoyer et al. |
| 3,238,477 A | 3/1966 | Brueckmann |

(Continued)

FOREIGN PATENT DOCUMENTS

| CN | 102147484 A | 8/2011 |
| EP | 2884309 A2 | 6/2015 |

(Continued)

OTHER PUBLICATIONS

International Search Report and Written Opinion, PCT/US2012/068367, dated Aug. 20, 2013.
(Continued)

*Primary Examiner* — Jermele M Hollington
*Assistant Examiner* — Taqi R Nasir
(74) *Attorney, Agent, or Firm* — Bracewell LLP; Constance G. Rhebergen; Linda L. Morgan

(57) ABSTRACT

An electromagnetic energy source for emitting pulses of electromagnetic energy includes a sonde assembly having a first section axially aligned with, and spaced from, a second section. An energy storage capacitor of the sonde assembly includes an electrode mounted in each of the first section and the second section of the sonde assembly and operable to generate an electric field, and a capacitive charge storage medium mounted in each of the first section and the second section of the sonde assembly and surrounding each electrode. The sonde assembly further includes a fast-closing switch located between the electrodes of the first and second sections of the sonde assembly.

6 Claims, 4 Drawing Sheets

(51) Int. Cl.
*G01V 3/20* (2006.01)
*G01V 3/30* (2006.01)
*G01V 3/08* (2006.01)

(58) Field of Classification Search
CPC ........ G01V 5/125; G01V 11/00; G01V 13/00; G01V 5/10; G01V 5/102
USPC ........ 324/226, 262, 219–221, 239–243, 338, 324/339, 340–343, 356–369, 437, 324/754.01–755.01; 702/1, 6, 11; 250/261, 253, 256, 258, 257, 254
See application file for complete search history.

(56) References Cited

U.S. PATENT DOCUMENTS

| | | | | |
|---|---|---|---|---|
| 4,109,522 A | * | 8/1978 | Thompson | G01V 3/30 250/253 |
| 4,246,586 A | | 1/1981 | Henderson et al. | |
| 4,430,653 A | | 2/1984 | Coon et al. | |
| 4,498,086 A | | 2/1985 | Sandler | |
| 4,661,700 A | * | 4/1987 | Holenka | G01V 5/125 250/256 |
| 4,785,247 A | * | 11/1988 | Meador | E21B 47/011 324/338 |
| 4,876,450 A | * | 10/1989 | Montgomery | E21B 47/011 250/261 |
| 5,041,922 A | | 8/1991 | Wood et al. | |
| 5,192,952 A | * | 3/1993 | Johler | G01S 13/0209 324/323 |
| 5,280,284 A | * | 1/1994 | Johler | G01S 13/02 342/189 |
| 5,302,895 A | * | 4/1994 | Philpot | G01V 3/107 324/220 |
| 5,323,114 A | * | 6/1994 | Nagamune | G01S 13/0209 324/334 |
| 5,373,443 A | * | 12/1994 | Lee | G01V 3/30 324/338 |
| 6,043,947 A | | 3/2000 | Gooch et al. | |
| 6,061,633 A | * | 5/2000 | Fukuhara | G01V 11/00 367/31 |
| 6,061,663 A | * | 5/2000 | Bloom | G06Q 40/04 705/36 R |
| 6,483,310 B1 | * | 11/2002 | Meador | G01V 3/28 324/338 |
| 6,651,739 B2 | | 11/2003 | Arndt et al. | |
| 6,753,814 B2 | | 6/2004 | Killen et al. | |
| 7,477,162 B2 | | 1/2009 | Clark | |
| 8,030,934 B2 | | 10/2011 | Barsukov et al. | |
| 8,664,587 B2 | | 3/2014 | Evans et al. | |
| 8,810,247 B2 | | 8/2014 | Kuckes | |
| 8,917,094 B2 | | 12/2014 | Bittar et al. | |
| 8,957,683 B2 | | 2/2015 | Bittar et al. | |
| 9,206,645 B2 | | 12/2015 | Hallundbaek | |
| 9,490,518 B1 | | 11/2016 | Herbsommer et al. | |
| 9,520,649 B2 | | 12/2016 | De Rochemont | |
| 9,568,635 B2 | | 2/2017 | Suhami | |
| 2005/0030036 A1 | * | 2/2005 | Hunziker | E21B 47/011 324/338 |
| 2006/0151863 A1 | * | 7/2006 | Das | H01L 23/49822 257/678 |
| 2006/0203613 A1 | | 9/2006 | Thomsen et al. | |
| 2007/0209799 A1 | | 9/2007 | Vinegar et al. | |
| 2007/0294036 A1 | | 12/2007 | Strack et al. | |
| 2008/0036452 A1 | | 2/2008 | Hirayama | |
| 2009/0133870 A1 | | 5/2009 | Pavlov et al. | |
| 2009/0150077 A1 | | 6/2009 | Stoller et al. | |
| 2009/0179649 A1 | * | 7/2009 | Schmidt | G01V 3/26 324/345 |
| 2009/0204330 A1 | | 8/2009 | Thomsen et al. | |
| 2009/0205899 A1 | | 8/2009 | Geerits et al. | |
| 2009/0224610 A1 | | 9/2009 | Fuks et al. | |
| 2009/0240436 A1 | * | 9/2009 | Heigl | G01V 1/48 702/11 |
| 2010/0060381 A1 | * | 3/2010 | Das | H05K 1/0234 333/172 |
| 2010/0085041 A1 | | 4/2010 | Pozidis et al. | |
| 2010/0155128 A1 | | 6/2010 | Tombs | |
| 2010/0155138 A1 | | 6/2010 | Kuckes | |
| 2010/0171426 A1 | | 7/2010 | Kloss et al. | |
| 2011/0108283 A1 | | 5/2011 | Srnka et al. | |
| 2011/0198078 A1 | | 8/2011 | Harrigan et al. | |
| 2011/0227577 A1 | | 9/2011 | Zhang et al. | |
| 2011/0255371 A1 | | 10/2011 | Jing et al. | |
| 2012/0120767 A1 | | 5/2012 | Vu et al. | |
| 2012/0201096 A1 | | 8/2012 | Valero et al. | |
| 2013/0006535 A1 | * | 1/2013 | Zhang | G01V 5/08 702/7 |
| 2013/0066587 A1 | | 3/2013 | Kalathil et al. | |
| 2013/0088364 A1 | | 4/2013 | Bittar et al. | |
| 2013/0146756 A1 | * | 6/2013 | Schmidt | G01V 5/08 250/264 |
| 2013/0249705 A1 | * | 9/2013 | Sharp | E21B 47/0905 340/854.7 |
| 2013/0319685 A1 | * | 12/2013 | Pike | E21B 41/00 166/378 |
| 2014/0060804 A1 | | 3/2014 | Barbour et al. | |
| 2014/0183694 A1 | | 7/2014 | Gardner et al. | |
| 2014/0275956 A1 | | 9/2014 | Fan | |
| 2014/0347055 A1 | | 11/2014 | Schmidt | |
| 2015/0097561 A1 | | 4/2015 | Desmulliez et al. | |
| 2015/0295651 A1 | | 10/2015 | Herbsommer et al. | |
| 2015/0357121 A1 | | 12/2015 | Andrakin | |
| 2016/0327677 A1 | | 11/2016 | Fouda et al. | |
| 2017/0012361 A1 | | 1/2017 | Prammer | |

FOREIGN PATENT DOCUMENTS

| | | |
|---|---|---|
| WO | 2008033225 A2 | 3/2008 |
| WO | 2016018377 A1 | 2/2016 |
| WO | 2016089387 A1 | 6/2016 |

OTHER PUBLICATIONS

International Search Report and Written Opinion for International Application No. PCT/US2018/022294, dated Jul. 6, 2018 (pp. 1-16).
Gao, B. et al.,"Ferrite Film Loaded Frequency Selective Metamaterials for Sub-GHz Applications", pp. 1-9, Materials 2016, 9(12), 1009.
Gong, B. et al; "Approach Trims Size of Dipole Antenna", Apr. 23, 2014.
Hwang, Y. et al., "Planar inverted F antenna loaded with high permittivity material", Electronics Letters, Sep. 28, 1995, pp. 1710-1712, vol. 31, Issue: 20, Shatin, NT, Hong Kong.
James, J.R. et al., "Electrically short monopole antennas with dielectric or ferrite coatings", Proceedings of the Institution of Electrical Engineers, vol. 125, Issue: 9; Sep. 1978, pp. 793-803.
Petrov, R.V., et al., "Antenna miniaturization with ferrite ferroelectric composites", Microwave and Optical Technology Letters, vol. 50, Issue 12, pp. 3154-3157, Dec. 2008.
Saenz, et al., "Resonant Meta-Surface Superstrate for Single and Multifrequency Dipole Antenna Arrays", IEEE Transactions on Antennas and Propagation, vol. 56 No. 4, pp. 951-960.
International Search Report and Written Opinion for related PCT application PCT/US2018/059585 dated Mar. 4, 2019; pp. 1-15.
International Search Report and Written Opinion for related PCT application PCT/US2018/062177 dated Mar. 4, 2019; pp. 1-17.
Subramanian et al., "High Dielectric Constant in ACu3Ti4O12 and ACu3Ti3FeO12 Phases", Journal of Solid State Chemistry, 2000, pp. 323-325, vol. 151, No. 2, Academic Press.
Thomas et al., "Nanoparticles of the giant dielectric material, CaCu3Ti4O12 from a precursor route", Journal of Physics and Chemistry of Solids, 2008, pp. 1-47.

* cited by examiner

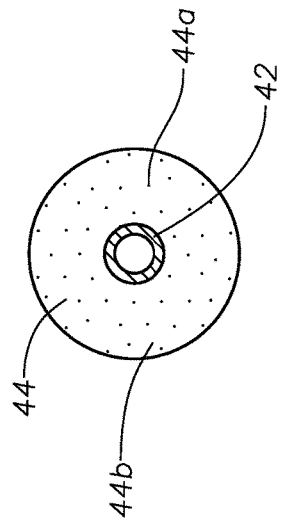
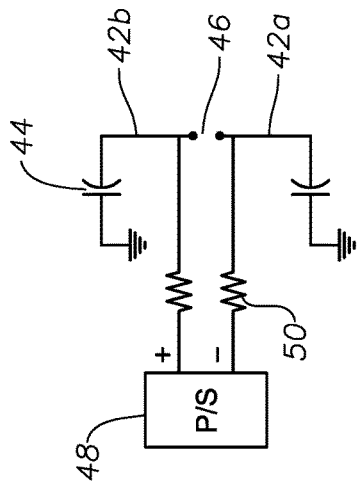
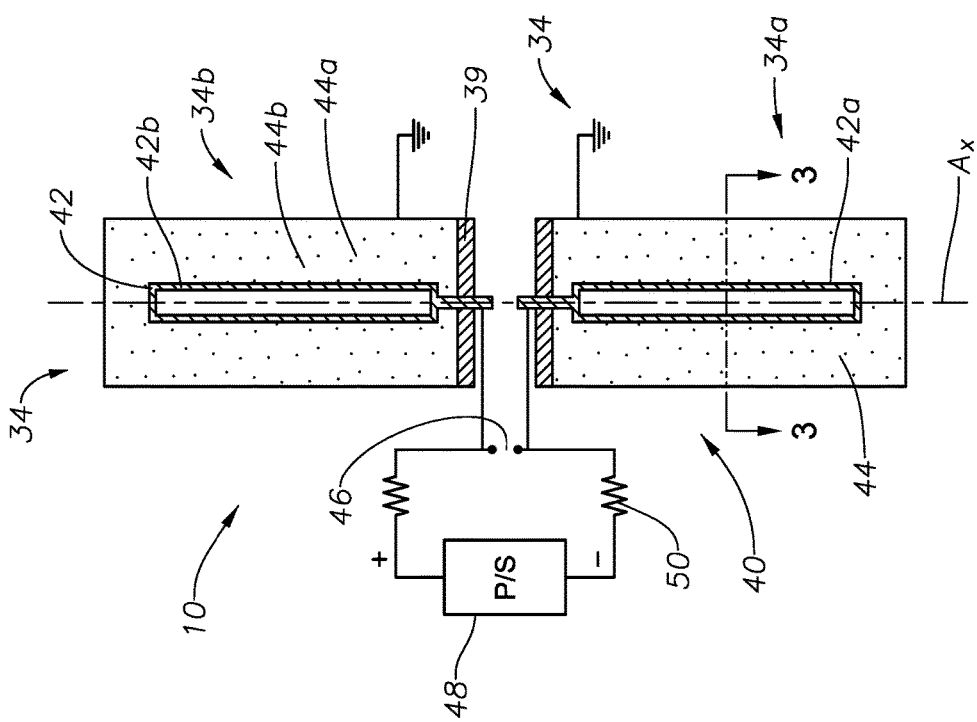

EMU IMPULSE ANTENNA

BACKGROUND OF THE INVENTION

1. Field of the Invention

The present invention relates to imaging sub-surface structures, particularly hydrocarbon reservoirs and fluids therein, and more particularly to electromagnetic energy sources for electromagnetic surveying of sub-surface structures.

2. Description of the Related Art

Some electromagnetic (EM) surveying systems used in geophysics provide electromagnetic energy for traveling through a subsurface hydrocarbon reservoir for electromagnetic imaging of the subsurface hydrocarbon reservoir. Multiple sources and receivers can be positioned either in a bore that extends to the subsurface hydrocarbon reservoir or an earth surface above the subsurface hydrocarbon reservoir. In this way, the direction, velocity and saturation of injected fluids (e.g. during water flood) can be monitored. The system can also be used to locate by-passed oil and detect high conductivity zones (e.g. fracture corridors and super-k zones) to provide early warning of water break-through. Such operations can assist in optimizing reservoir management, preventing oil bypass and thereby improving volumetric sweep efficiency and production rates.

Some current EM systems in geophysics include an overly large antenna in order to be able to generate a moderately low frequency signal out of a small antenna. The apparent 'aperture' of the antenna (wavelength to antenna size ratio) can be problematic. Some current EM systems cannot easily match impedance of the system to the geological matrix and increase transmission efficiency. Some current EM systems use high-current cable to provide power to the EM transmitter. However, these systems have been shown to have difficulty transferring a crisp high-current pulse from the power supply, down a low-loss cable, and then matching that into the antenna and in addition, the high-current cabling can also transmit a signal, which made the resulting measurements unclear.

SUMMARY OF THE DISCLOSURE

Embodiments of this disclosure combines a slow-wave antenna with energy storage and pulse forming elements to realize a high power, small aperture transmitting antenna that is ideally suited for downhole electromagnetic interrogation technologies, such as for electromagnetic imaging of a subsurface hydrocarbon reservoir. Systems and methods described herein provide a transmitter that is compact, very high in instantaneous power output and generates a very clean signal.

Embodiments of this disclosure provide a dipole antenna that both increases radiation resistance and transmitter efficiency. The length of the antenna is shorter than some current antennas because the dipole antenna components are loaded with materials with relatively high dielectric permittivity (e), magnetic permeability (mu), or a combination of dielectric permittivity and magnetic permeability. The material can be selected so that e and mu of such material optimizes transmitter impedance to match the external medium. This increases the capacitance and inductance of the system and decreases the group velocity of the signal traveling along the antenna element, and can materially decrease the length of the antenna structure for a given wavelength emitted.

In addition, the antenna elements of embodiments of this disclosure are used as capacitive energy storage elements, with each half of the dipole initially held at a high voltage relative to one another. A fast-closing switch, such as a triggered spark gap, is provided between a pair of such antennas to initiate pulsed transmission. The pair of antennas is biased apart by a large voltage so that the structure can discharge in a single massive current pulse and emit a very high power transient radio frequency signal. Systems and methods of this disclosure therefore combine energy storage, pulse formation and radiating elements into a single structure, eliminating the need for impedance matching between separate distributed components for these respective functions.

Systems and methods of this disclosure eliminate the problem of load matching between a power supply, cable or transmission-line and antenna. With the energy storage element and switch inside the transmitting antenna element, the cable between the two is eliminated, minimizing reflections and losses in the system.

In an embodiment of this disclosure, an electromagnetic energy source for emitting pulses of electromagnetic energy includes a sonde assembly having a first section axially aligned with, and spaced from, a second section. An energy storage capacitor of the sonde assembly includes an electrode mounted in each of the first section and the second section of the sonde assembly and operable to generate an electric field, and a capacitive charge storage medium mounted in each of the first section and the second section of the sonde assembly and surrounding each electrode. A fast-closing switch is located between the electrodes of the first and second sections of the sonde assembly.

In alternate embodiments, the electromagnetic energy source can further include a high voltage power supply connected between the electrodes. Current limiting resistors can be located between the high voltage power supply and the electrodes. The capacitive charge storage medium can be selected to provide a decrease of a group velocity of pulses of electromagnetic energy. The capacitive charge storage medium can be formed of a material that includes iron particles and an epoxy matrix.

In other alternate embodiments, the electromagnetic energy source can further include a plurality of electromagnetic energy sources emitting pulses of electromagnetic energy to travel through a subsurface hydrocarbon reservoir. The electromagnetic energy source can be movable to a succession of locations in a well borehole for emitting the pulses of electromagnetic energy at the locations for travel through a subsurface hydrocarbon reservoir. The sonde assembly can have a conductor member serving as a first conductor and the electrode can serve as a second conductor. The capacitive charge storage medium can be located between the conductor member and the electrode. The conductor member can be electrically isolated from the electrode with the capacitive charge storage medium.

In an alternate embodiment of this disclosure, a source for emitting the pulses of electromagnetic energy to travel through a subsurface hydrocarbon reservoir for electromagnetic imaging of the subsurface hydrocarbon reservoir includes a sonde assembly and fast closing switch attached to a wireline for travel in a well borehole to a depth of interest.

In another alternate embodiment of this disclosure, a system for using pulses of electromagnetic energy to travel through a subsurface hydrocarbon reservoir for electromagnetic imaging of the subsurface hydrocarbon reservoir includes at least one electromagnetic energy source. Each electromagnetic energy source has a sonde assembly attached to a wireline for travel in a well borehole to a depth of interest, the sonde assembly including a first section axially aligned with, and spaced from, a second section. An energy storage capacitor is formed by a conductor member extending along the sonde assembly, an electrode is mounted in each of the first section and the second section of the sonde assembly and serving as a second conductor, and a capacitive charge storage medium is mounted in each of the first section and the second section of the sonde assembly between the sonde assembly and the electrode. A fast-closing switch is located between one of the conductor members and the electrodes of the first and second sections. A plurality of electromagnetic sensors form a measure of a resulting signal from the electromagnetic energy source.

In alternate embodiments, the plurality of electromagnetic sensors can be mounted in a well tool lowered in sensor bore in the subsurface hydrocarbon reservoir. The plurality of electromagnetic sensors can be located in an array over an earth surface above the subsurface hydrocarbon reservoir. The system can have a system control unit for storing information relating to the resulting signal received by the plurality of electromagnetic sensors and for performing a computerized analysis of the resulting signal.

In yet another alternate embodiment of this disclosure, a method for emitting pulses of electromagnetic energy with an electromagnetic energy source includes providing an electromagnetic energy source having: a sonde assembly including a first section axially aligned with, and spaced from, a second section; an energy storage capacitor including an electrode mounted in each of the first section and the second section of the sonde assembly and a capacitive charge storage medium mounted in each of the first section and the second section of the sonde assembly and surrounding the electrode; and a fast-closing switch located between the electrodes of the first and second sections. The method further includes charging the energy storage capacitor to cause the fast-closing switch to close and pulses of electromagnetic energy to be emitted from the electromagnetic energy source.

In alternate embodiments, the electromagnetic energy source can further include a high voltage power supply connected to the electrode of the first section and the electrode of the second section of the sonde assembly. The electromagnetic energy source can further include current limiting resistors located between the high voltage power supply and both of the electrode of the first section and the electrode of the second section. The method can further include lowering the electromagnetic energy source on a wireline in a well borehole to a depth of interest in a subsurface hydrocarbon reservoir.

In other alternate embodiments, the method can further include moving the electromagnetic energy source to a succession of locations in a well borehole for emitting the pulses of electromagnetic energy at the locations for travel through a subsurface hydrocarbon reservoir. A plurality of electromagnetic sensors can be lowered through a sensor bore in a subsurface hydrocarbon reservoir. A plurality of electromagnetic sensors can be located in an array over an earth surface above a subsurface hydrocarbon reservoir. The pulses of electromagnetic energy can be emitted from the electromagnetic energy source to travel through a subsurface hydrocarbon reservoir.

In yet other alternate embodiments, the method includes forming a measure of arrival time data of the pulses of electromagnetic energy at a plurality of electromagnetic sensors, analyzing the measure of arrival time data from the plurality of electromagnetic sensors to form a representation of subsurface features of the subsurface hydrocarbon reservoir, and forming an image of the representation of subsurface features of the subsurface hydrocarbon reservoir.

In still another alternate embodiment of this disclosure, a method for electromagnetic imaging of a subsurface hydrocarbon reservoir includes lowering an electromagnetic energy source on a wireline in a well borehole to a depth of interest in the subsurface hydrocarbon reservoir. The electromagnetic energy source includes a sonde assembly attached to the wireline for travel in the well borehole, the sonde assembly including a first section axially aligned with, and spaced from, a second section. The electromagnetic energy source also includes an energy storage capacitor formed by a conductor member of the sonde assembly, an electrode mounted in each of the first section and the second section of the sonde assembly and serving as an inner conductor, and a capacitive charge storage medium mounted in each of the first section and the second section of the sonde assembly between the conductor member and the electrode. The electromagnetic energy source further includes a fast-closing switch located between one of the conductor members and the electrodes, of the first and second sections. Pulses of electromagnetic energy are emitted with the electromagnetic energy source to travel through the sub surface hydrocarbon reservoir.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 2 is a schematic section view of an electromagnetic energy source and storage capacitor, in accordance with an embodiment of this disclosure.

FIG. 3 is a schematic cross section view of the electromagnetic energy source of FIG. 2.

FIG. 4 is a schematic cross section view of the electromagnetic energy source of FIG. 2.

DETAILED DESCRIPTION OF THE PREFERRED EMBODIMENTS

Figure 1:
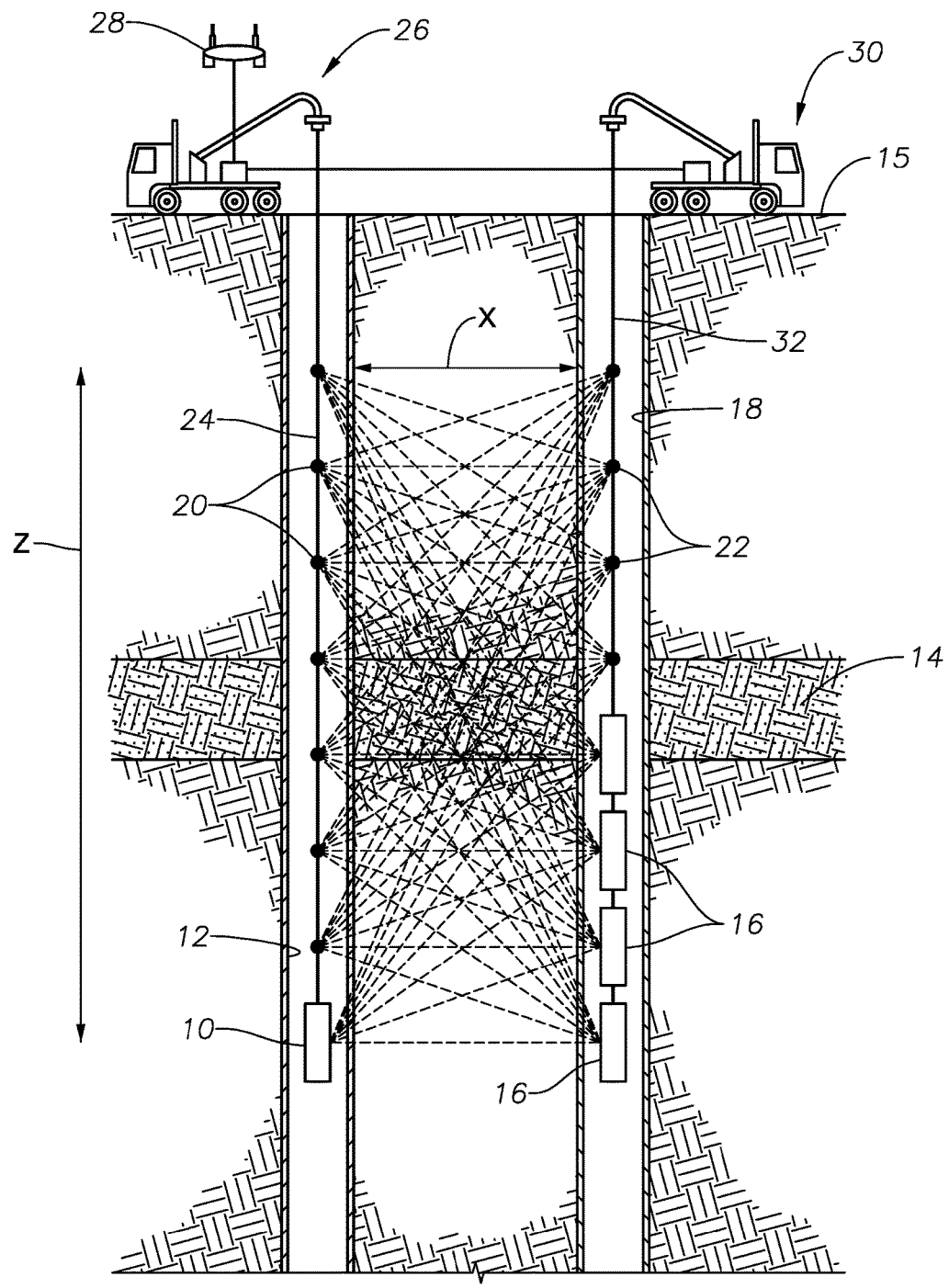
FIG. 1 is a schematic section view of a transmitter-receiver array for a borehole to borehole electromagnetic survey, in accordance with an embodiment of this disclosure.

Looking at FIG. 1, an example arrangement of a transmitter-receiver array for a borehole to borehole electromagnetic survey is shown. The transmitter can be electromagnetic energy source 10. Electromagnetic energy source 10 can be located within well borehole 12. Well borehole 12 can extend through subsurface hydrocarbon reservoir 14. Electromagnetic energy source 10 can emit pulses of electromagnetic energy to travel through subsurface hydrocarbon reservoir 14 for electromagnetic imaging of subsurface hydrocarbon reservoir 14.

Although one electromagnetic energy source 10 is shown in the example of FIG. 1, in alternate embodiments, multiple electromagnetic energy sources 10 can be located within borehole 12. Alternately, one or more electromagnetic energy sources 10 can be located at the earth surface 15 above the subsurface hydrocarbon reservoir. In the example of FIG. 1, a series of electromagnetic sensors 16 are located in sensor bore 18. Sensor bore 18 can be a borehole that extends through subsurface hydrocarbon reservoir 14 and spaced apart from well borehole 12. In alternate embodiments, electromagnetic sensors 16 can be in an array over the earth surface 15 above subsurface hydrocarbon reservoir 14. When electromagnetic energy source 10 is located in well borehole 12 and electromagnetic sensors 16 are located over the earth surface 15, the arrangement is known as a borehole to surface array. Generally either or both of the electromagnetic energy source 10 and electromagnetic sensors 16 are located within a borehole so that the EM signals pass through subsurface hydrocarbon reservoir 14 when traveling from electromagnetic energy source 10 to electromagnetic sensors 16. Electromagnetic sensors 16 can form a measure of the arrival time of the emitted pulses from electromagnetic energy source 10 to image subsurface hydrocarbon reservoir 14.

As can be seen in FIG. 1, a multitude of EM energy measurements can be performed with different combinations of transmitter locations 20 and receiver locations 22 in order to sample various parts of the subterranean features from different directions, including subsurface hydrocarbon reservoir 14. Both the electromagnetic energy source 10 and electromagnetic sensors 16 can be a part of a downhole tool or located in a tool and can be movable to between a succession of locations, such as between transmitter locations 20 and receiver locations 22.

Electromagnetic energy source 10 can be attached to source wireline 24 for travel in well borehole 12 to a depth of interest. In the example of FIG. 1, the source wireline 24 extends from vehicle 26 at the surface. System control unit 28 can be associated with vehicle 26 and can be used to control the pulses emitted by electromagnetic energy source 10. A second vehicle 30 can have a receiver wireline 32 for attaching to electromagnetic sensors 16 and for moving electromagnetic sensors 16 within sensor bore 18.

Looking at FIGS. 2-3, and 5-8, electromagnetic energy source 10 includes sonde assembly 34. Sonde assembly 34 has two main sections: first section 34a is axially aligned with, and spaced from, second section 34b. Electromagnetic energy source 10 also includes energy storage capacitor 40 with capacitive charge storage medium 44.

An electrode 42 is mounted in, each of first section 34a and second section 34b of sonde assembly 34. First electrode 42a is located in first section 34a and second electrode 42b is located in second section 34b. Electrode 42 can be an elongated member and have a tubular shape (FIGS. 2-3), or can be a solid rod or wire (FIGS. 5-8). Electrode 42 can be formed of copper, and in alternate embodiments, can be formed of silver, aluminum, gold or other suitable similar material.

The capacitive charge storage medium 44 is mounted in each of the first section 34a and the second section 34b of the sonde assembly 34. Capacitive charge storage medium 44 can be formed with materials with relatively high dielectric permittivity, magnetic permeability, or a combination of dielectric permittivity and magnetic permeability. The material can be selected so that e and mu of such material optimizes transmitter impedance to match the external medium. This increases the capacitance and inductance of the system and decreases the group velocity of the pulses emitted by electromagnetic energy source 10, to define a slow-wave antenna. Providing such a capacitive charge storage medium 44 can materially decrease the length of an antenna structure for a given wavelength emitted. As an example, capacitive charge storage medium 44 can be formed of a material that includes ferrite, steel, permalloy, TiO2, PZT, magnetite, other iron particles, or a mix thereof. Such particles 44a can be mixed in an epoxy matrix 44b. The specific composition of the mixture used for capacitive charge storage medium 44 would depend on the properties of the reservoir materials and the geometry of the antenna. In an example embodiment, capacitive charge storage medium 44 can have particles 44a with a dielectric permittivity of 100 (e), and a magnetic permeability of 100 (mu) and consist of both TiO2 and magnetite. These particles 44a can be located in a 1:1 mixture in an insulating epoxy matrix 44b. This example embodiment would result in an overall dielectric permittivity in the range of 40 (e), and a magnetic permeability in the range of 40 (mu) after considering the linear combination of the components, per effective medium theory, and therefore will result in an effective antenna that performs as though it is in the range of 40 times larger than the actual length of the antenna.

In the example embodiments of FIGS. 2-3 an electric field can radiate out from each electrode 42 and through the nearby capacitive charge storage medium 44 forming energy storage capacitor 40. In the example embodiments of FIGS. 5-8, conductor member 33 of sonde assembly 34 serves as a first conductor and capacitive charge storage medium 44 is located between the conductor member 33 and electrode 42. Capacitive charge storage medium 44 electrically isolates conductor member 33 from electrode 42.

Electromagnetic energy source 10 can further include fast-closing switch 46, which is located between one of the electrode 42 (FIGS. 2, 4, and 5) or the conductor member 33 (FIGS. 7 and 9) of the first and second sections 34a, 34b. Fast-closing switch 46 can be, for example, a spark gap. When fast-closing switch is closed, such as when the spark gap is broken down, electromagnetic energy source 10 will generate an electromagnetic pulse. In alternate embodiments, fast-closing switch 46 can include avalanche transistors, thyratrons, ignitrons, silicon-controlled rectifier, and especially triggered spark gaps. Fast-closing switch 46 can be selected to have performance metrics concerning peak current, peak voltage, useful number of shots, jitter, complexity and geometry that will suit the environment, conditions, and performance criteria for which the electromagnetic energy source 10 is to be used.

Figure 9:
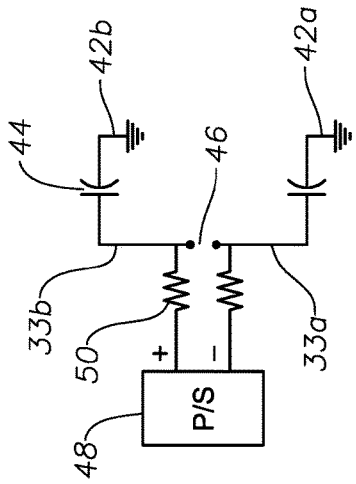
FIG. 9 is a circuit diagram of the electromagnetic energy source of FIG. 7.
Figure 7:
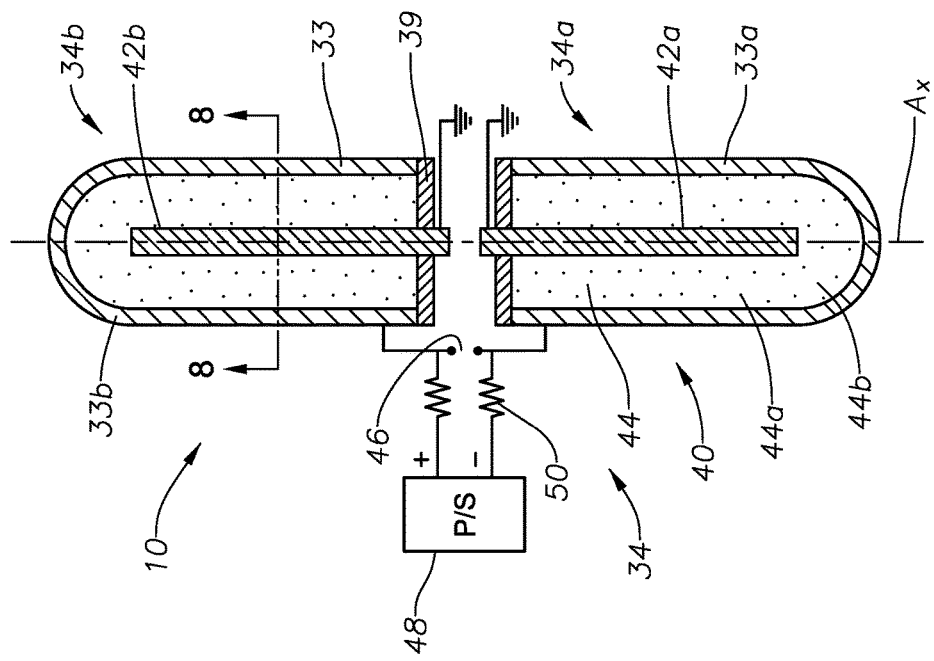
FIG. 7 is a schematic section view of an electromagnetic energy source, in accordance with an embodiment of this disclosure.

Electromagnetic energy source 10 can also have high voltage power supply 48 connected between one of the electrodes 42 (FIGS. 2, 4, and 5) or the conductor members 33 (FIGS. 7 and 9). Electromagnetic energy source 10 will be located between the same of the electrode 42 (FIGS. 2, 4, and 5) or the conductor member 33 (FIGS. 7 and 9) as fast-closing switch 46. A component that is not directly connected to electromagnetic energy source 10 can act as a ground.

In the example embodiment of FIG. 2, fast-closing switch 46 is connected between first and second sections 42a, 42b of electrode 42 and high voltage power supply is also connected between first and second sections 42a, 42b of electrode 42. In this example, capacitive charge storage medium 44 acts as a ground. In such an embodiment, capacitive charge storage medium 44 proximate to electrode 42 will form energy storage capacitor 40 and capacitive charge storage medium 44 proximate to an outer diameter of capacitive charge storage medium 44 will act as the ground.

Figure 6:
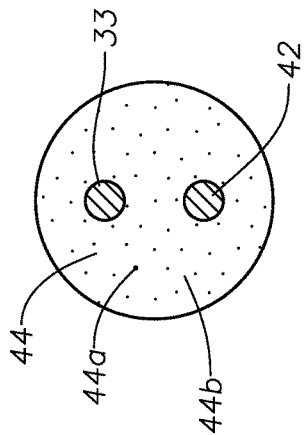
FIG. 6 is a schematic cross section view of the electromagnetic energy source of FIG. 5.
Figure 5:
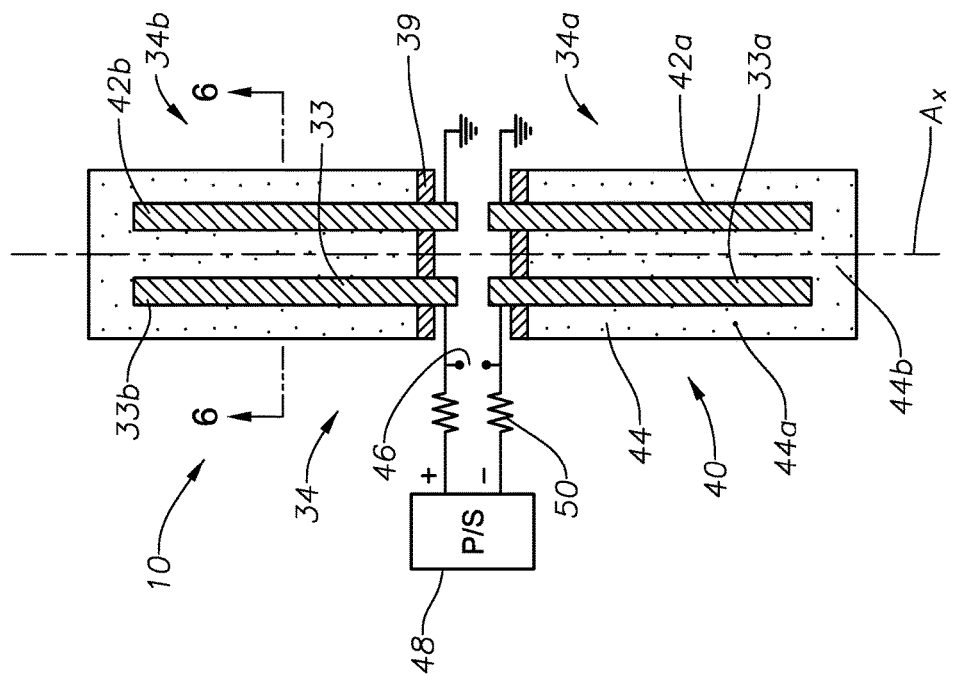
FIG. 5 is a schematic section view of an electromagnetic energy source, in accordance with an embodiment of this disclosure.

Looking at FIGS. 5 and 6, fast-closing switch 46 is connected between first and second sections 33a, 33b of conductor member 33 and high voltage power supply is also connected between first and second sections 33a, 33b of conductor member 33. In this example, first electrode 42a and second electrode 42b act as grounds. Looking at FIGS. 7 and 9, fast-closing switch 46 is connected between first and second sections 33a, 33b of conductor member 33 and high voltage power supply is also connected between first and second sections 33a, 33b of conductor member 33. In this example, first electrode 42a and second electrode 42b act as grounds.

Power can be provided to high voltage power supply 48 from outside of electromagnetic energy source 10 with pair of high resistivity leads. High impedance DC connections will reduce the amount of induced current that will be generated in the connections by the high current pulse through electrode 42 when sonde assembly 34 discharges. In alternate embodiments, the magnetic permeability property of capacitive charge storage medium 44 to channel power as a magnetic field down the length of second section 34b of sonde assembly 34 can be utilized. Second section 34b of sonde assembly 34 can be associated with a pick up coil located between first and second sections 34a, 34b of sonde assembly 34 to harvest power at the high voltage power supply 48. In this embodiment, the power could be generated at the top of Second section 34b of sonde assembly 34 with a coil that generates a high frequency coaxial magnetic field. Such as configuration would provide an inductively coupled transformer, as would be evident to those skilled in the art. Such an embodiment would eliminate any parallel conductors along the second section 34b of sonde assembly 34 and there by eliminate any parasitics that would degrade the transmitted pulse.

Current limiting resistors 50 can be located between the high voltage power supply and both of the electrode of the first section and the electrode of the second section. Current limiting resistors 50 can block high current pulses from returning up the supply wire towards high voltage power supply 48. This will isolate the antenna system, from high voltage power supply 48 while the electromagnetic pulse is being emitted.

Each section 34a, 34b of sonde assembly 34 can have end cap 39 formed of an insulating material. The capped end of first section 34a and second section 34b can face towards each other. Electrode 42 can protrude through end cap 39 of sonde assembly 34.

In the example embodiment of FIGS. 2-3, each section 34a, 34b of sonde assembly 34 can include an elongated tubular member with a central bore centered around axis Ax. Electrode 42 is centered along axis Ax of each of first section 34a and second section 34b of sonde assembly 34. Electrode 42 can be located within the central bore of sonde assembly 34. Electrode 42 can be an elongated member and have a tubular shape. Electrode 42 is sheathed within capacitive charge storage medium 44 so that capacitive charge storage medium 44 surrounds electrode 42. An end of electrode 42 passes through end cap 39. Energy storage capacitor 40 is formed by an electric field radiating out from electrode 42 and through the nearby capacitive charge storage medium 44. The amount of energy stored will vary with the square of the electric field. If Electrode 42 has a small diameter, then almost all of the electric field potential drop will occur inside the capacitive charge storage medium 44.

Looking at the alternate example embodiment of FIGS. 5-6, conductor member 33 can be a wire that extends through each section 34a, 34b of sonde assembly 34. Conductor member 33 is sheathed within capacitive charge storage medium 44. Electrode 42 can also be a wire that extends through each section 34a, 34b of sonde assembly 34. Electrode 42 is also sheathed within capacitive charge storage medium 44. An end of both electrodes 42 and conductor member 33 pass through end cap 39. Energy storage capacitor 40 is formed by the pair of wires, which are electrode 42 and conductor member 33 which can have a great potential voltage between them. Capacitive charge storage medium 44 between electrode 42 and conductor member 33 increases the mutual capacitance of electrode 42 and conductor member 33. Conductor member 33 and electrode 42 serve both as conductor elements of energy storage capacitor 40 and as part of the transmitting elements of electromagnetic energy source 10 for emitting the electromagnetic pulse.

Figure 8:
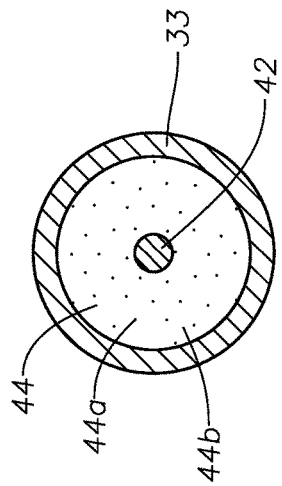
FIG. 8 is a schematic cross section view of the electromagnetic energy source of FIG. 7.

In the alternate examples of FIGS. 7-8, conductor member 33 can be an outer metallic body of sonde assembly 34. Each section 34a, 34b of sonde assembly 34 can have an elongated tubular member, such as a metallic body, that is closed at one end and has an end cap 39 at an opposite end. Sonde assembly 34 can have a central bore centered around axis Ax. Electrode 42 is centered along axis Ax of each of first section 34a and second section 34b of sonde assembly 34. Electrode 42 can be located within the central bore of sonde assembly 34 and can protrude through end cap 39 of sonde assembly 34. Electrode 42 can be an elongated member and be a solid rod. Conductor member 33 and electrode 42 serve both as conductor elements of energy storage capacitor 40 and as part of the transmitting elements of electromagnetic energy source 10 for emitting the electromagnetic pulse.

Looking at FIG. 1, in an example of operation, in order to form an electromagnetic image of subsurface hydrocarbon reservoir 14 electromagnetic energy source 10 can be mounted to, or part of, a well tool and lowered on a wireline in well borehole 12 to a depth of interest.

The downhole tool associated with electromagnetic energy source 10 can have an upper section with a mechanical connector that attaches to a wire line, an electrical power connection, and a synchronizing signal connection. Such upper section and connections can be orientated like known current downhole wireline tools. A lower section of the downhole tool can house sonde assembly 34. Electromagnetic energy source 10 can be encased in a strong, insulating polymeric material to provide structural integrity while also allowing for the transmission of electromagnetic signals.

A single electromagnetic energy source 10 can be utilized, as shown in the example of FIG. 1. Alternately, a plurality of electromagnetic energy sources 10 can be lowered in well borehole 12.

Pulses of electromagnetic energy can be emitted from the single electromagnetic energy source 10, or at each of the plurality of electromagnetic energy sources 10, as applicable, to travel through subsurface hydrocarbon reservoir 14 and a resulting signal can be received by electromagnetic sensors 16. An electromagnetic pulse with known characteristics is generated from the high power, pulsed electromagnetic energy source 10 from locations in or near subsurface hydrocarbon reservoir 14. In order to generate the electromagnetic pulse, high voltage power supply 48 charges up energy storage capacitor 40 through current limiting resistor 50 until fast-closing switch 46 is closed. In the Example of FIG. 2, fast-closing switch 46 is a spark gap that is closed when the voltage exceeds the break-down voltage of the spark gap. With the fast-closing switch closed, electromagnetic energy source 10 will emit the pulse of electromagnetic energy. After the electromagnetic pulse is emitted, high voltage power supply 48 can recharge energy storage capacitor 40.

By combining energy storage, pulse formation and radiating elements into a single structure, the problem of impedance matching between separate distributed components of an electromagnetic survey system required for these respective functions is eliminated. Systems and methods of this disclosure therefore eliminate the problem of load matching between a power supply, cable or transmission-line, and antenna. With the energy storage element of energy storage capacitor 40 and fast-closing switch 46 both inside the transmitting antenna element of the pair of disclosed self-powered impulse antennas, the need for a cable between the power source and the transmission element are eliminated, and reflections and losses in the system are minimized.

A plurality of electromagnetic sensors 16 can be mounted to or part of a well tool and lowered in sensor bore 18 that extends through subsurface hydrocarbon reservoir 14. Alternately, the plurality of electromagnetic sensors 16 can be arranged in an array over an earth surface 15 above subsurface hydrocarbon reservoir 14. The emitted pulsed EM signal is transmitted through subsurface hydrocarbon reservoir 14 and recorded at one or more electromagnetic sensors 16 after travel through the subsurface formations surrounding well borehole 12 and sensor bore 18. The EM signal recorded by electromagnetic sensors 16 differs from the pulsed signal emitted by electromagnetic energy source 10 in characteristics (e.g. time, amplitude, power spectrum, etc.) that depend on the properties of the intervening medium (e.g. the reservoir) and spatial variations of those properties.

Electromagnetic energy source 10 can be moved between a succession of locations, such as transmitter locations 20, in well borehole 12 for emitting pulses of electromagnetic energy at such locations for travel through subsurface hydrocarbon reservoir 14. Similarly, electromagnetic sensors 16 can be moved between a succession of locations, such as receiver locations 22, to receive the resulting signal at such succession of locations. In this way, a more complete electromagnetic image can be formed of subsurface hydrocarbon reservoir 14.

Recording and processing instrumentation associated with system control unit 28 at the surface can receive and store information relating to the resulting signal received by electromagnetic sensors 16. System control unit 28 can also perform additional functions such as computerized analysis of the resulting signal, display certain results derived from the resulting signal, and store the resulting signal and computerized analysis on a computer for further processing and computerized analysis. System control unit 28 can, as an example, be used to form a measure of the arrival time of the emitted pulses at a plurality of electromagnetic sensors, and to analyze the measure of arrival time data from the plurality of electromagnetic sensors. From this information, a representation of subsurface features of the subsurface hydrocarbon reservoir, and an image of the representation of subsurface features of the subsurface hydrocarbon reservoir, can be formed.

Embodiments of present invention thus generate information about the spatial distribution and composition of fluids in a hydrocarbon reservoir. The operation can be repeated periodically to, as an example determine the direction, velocity and saturation of injected fluids, such as a water flood, or to visualize modified reservoir volume as a function of time. This can assist in optimizing reservoir management, preventing oil bypass and thereby improving volumetric sweep efficiency and production rates.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. An electromagnetic energy source for emitting pulses of electromagnetic energy, the electromagnetic energy source comprising:
   a sonde assembly including a first section axially aligned with, and spaced from, a second section;
   an energy storage capacitor including:
      an electrode mounted in each of the first section and the second section of the sonde assembly and operable to generate an electric field; and
      a capacitive charge storage medium mounted in each of the first section and the second section of the sonde assembly and surrounding each electrode;
   a fast-closing switch located between the electrodes of the first and second sections of the sonde assembly; where the sonde assembly has a conductor member serving as a first conductor and the electrode serves as a second conductor, and the conductor member is electrically isolated from the electrode with the capacitive charge storage medium.

2. The electromagnetic energy source according to claim 1, wherein the capacitive charge storage medium is selected to provide a decrease of a group velocity of pulses of electromagnetic energy.

3. The electromagnetic energy source according to claim 1, wherein the capacitive charge storage medium is formed of a material that includes iron particles and an epoxy matrix.

4. The electromagnetic energy source according to claim 1, wherein the electromagnetic energy source further includes a plurality of electromagnetic energy sources emitting pulses of electromagnetic energy to travel through a subsurface hydrocarbon reservoir.

5. The electromagnetic energy source according to claim 1, wherein the electromagnetic energy source is movable to a succession of locations in a well borehole for emitting the pulses of electromagnetic energy at the locations for travel through a subsurface hydrocarbon reservoir.

6. The electromagnetic energy source according to claim 1, wherein the capacitive charge storage medium is located between the conductor member and the electrode.

* * * * *